INVENTOR
JOSEPH C. R. LICKLIDER
BY William D. Hall
ATTORNEY

PULSE GENERATOR

Filed April 30, 1946 2 Sheets-Sheet 2

FIG. 4

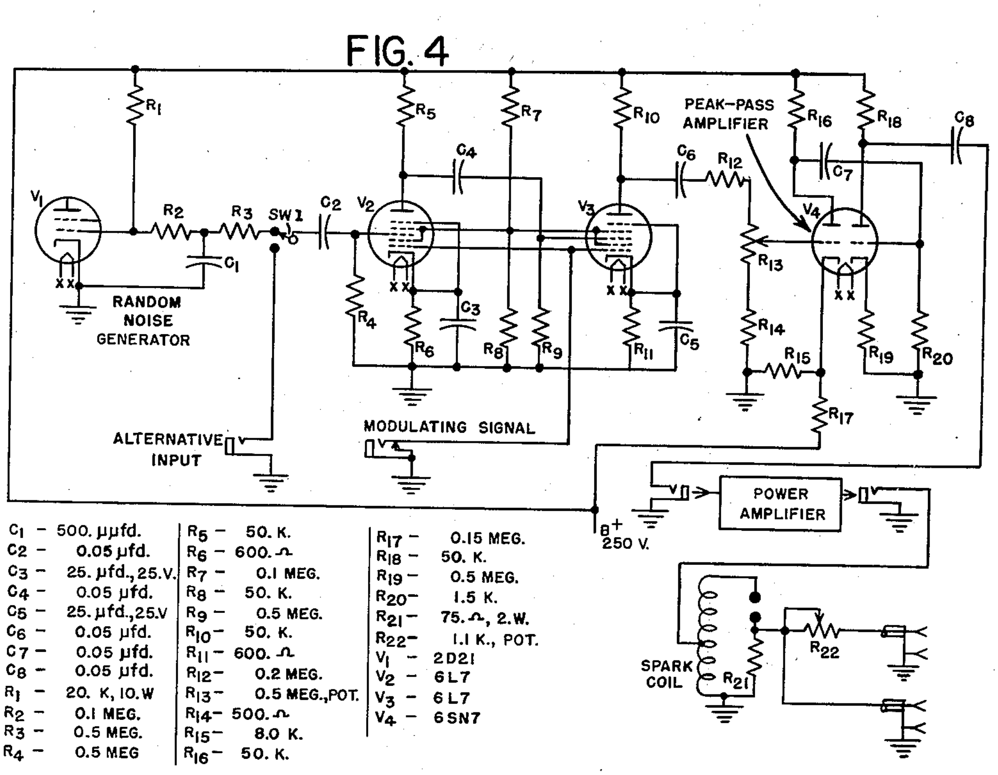

| | | |
|---|---|---|
| C1 - 500. μμfd. | R5 - 50. K. | R17 - 0.15 MEG. |
| C2 - 0.05 μfd. | R6 - 600. Ω | R18 - 50. K. |
| C3 - 25. μfd., 25.V. | R7 - 0.1 MEG. | R19 - 0.5 MEG. |
| C4 - 0.05 μfd. | R8 - 50. K. | R20 - 1.5 K. |
| C5 - 25. μfd., 25 V | R9 - 0.5 MEG. | R21 - 75. Ω, 2.W. |
| C6 - 0.05 μfd. | R10 - 50. K. | R22 - 1.1 K., POT. |
| C7 - 0.05 μfd. | R11 - 600. Ω | V1 - 2D21 |
| C8 - 0.05 μfd. | R12 - 0.2 MEG. | V2 - 6L7 |
| R1 - 20. K, 10.W | R13 - 0.5 MEG., POT. | V3 - 6L7 |
| R2 - 0.1 MEG. | R14 - 500. Ω | V4 - 6SN7 |
| R3 - 0.5 MEG. | R15 - 8.0 K. | |
| R4 - 0.5 MEG | R16 - 50. K. | |

FIG. 5

| | |
|---|---|
| C13 - 20. μfd., 450.V. | R5 - 0.25 MEG. |
| C14 - 40. μfd., 450.V. | R6 - 0.25 MEG. |
| C15 - 20. μfd., 150.V. | R7 - 50. K., POT. |
| R1 - 0.5 MEG. | R8 - 1.0 MEG. |
| R2 - 10. K. | R9 - 10. K. |
| R3 - 50. K. | R10 - 10. K. |
| R4 - 5.0 K. | R11 - 10. MEG. |

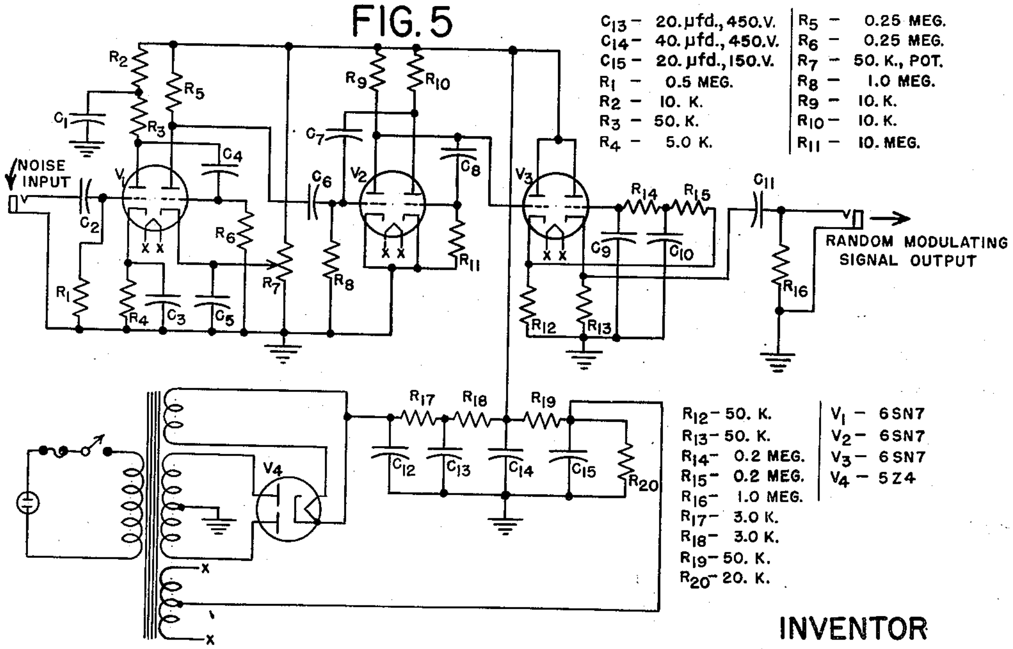

| | |
|---|---|
| R12 - 50. K. | V1 - 6SN7 |
| R13 - 50. K. | V2 - 6SN7 |
| R14 - 0.2 MEG. | V3 - 6SN7 |
| R15 - 0.2 MEG. | V4 - 5Z4 |
| R16 - 1.0 MEG. | |
| R17 - 3.0 K. | |
| R18 - 3.0 K. | |
| R19 - 50. K. | |
| R20 - 20. K. | |

| | | |
|---|---|---|
| C1 - 10. μfd., 250.V. | C5 - 10. μfd., 250.V. | C9 - 0.5 μfd. |
| C2 - 0.05 μfd. | C6 - 0.1 μfd. | C10 - 0.5 μfd. |
| C3 - 25. μfd., 25.V. | C7 - 0.5 μfd. | C11 - 4.0 μfd. |
| C4 - 0.05 μfd. | C8 - 1.0 μfd. | C12 - 20. μfd., 450.V. |

INVENTOR
JOSEPH C. R. LICKLIDER
BY William D. Hall
ATTORNEY

Patented Sept. 11, 1951 2,567,850

UNITED STATES PATENT OFFICE 2,567,850

PULSE GENERATOR

Joseph C. R. Licklider, Cambridge, Mass., assignor to the United States of America as represented by the Executive Secretary of the Office of Scientific Research and Development Application April 30, 1946, Serial No. 665,999

2 Claims. (Cl. 250—37)

This invention relates to the fields of electronics and communication. In particular, the invention consists in a means of producing very sharp pulses of electrical power (or voltage or current) which are useful in numerous applications within the fields of electronics and communication. One application, which is considered herein in detail, concerns the simulation of impulse-type radio interference. For this application, several variations of the invention are described.

Figure 1:
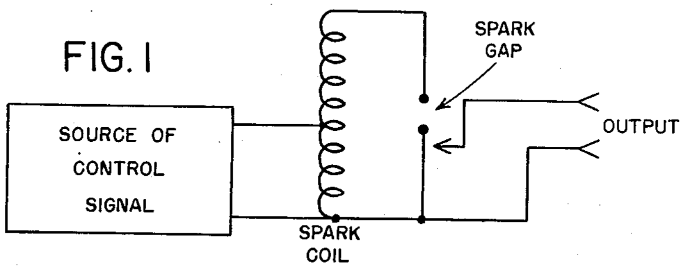
Figure 2:
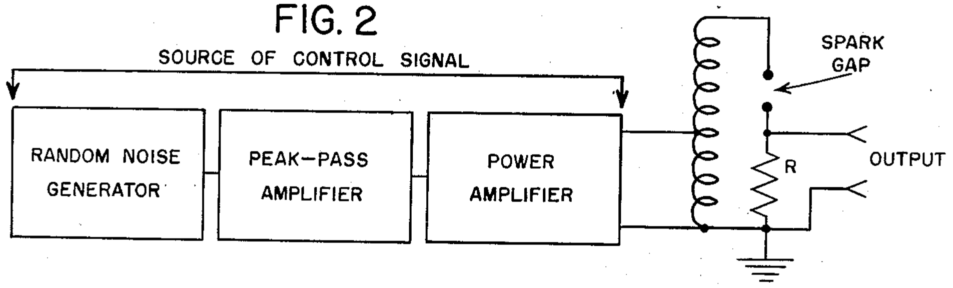
Figure 3:
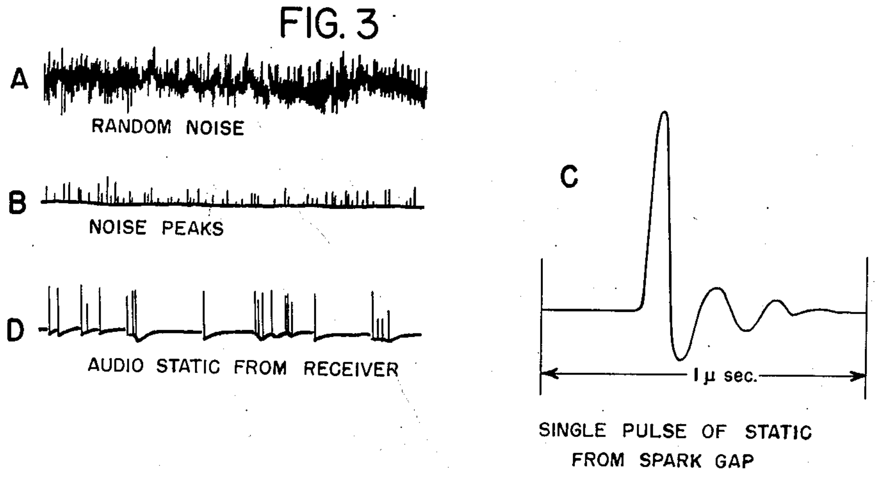

In the accompanying drawings:

Figures 1, 2 and 3 are diagrammatic views illustrating a preferred embodiment of the invention; and Figures 4 and 5 are schematic diagrams indicating circuits of the invention.

The method of the invention involves the use of a spark gap and a means of developing a sufficiently high transient voltage across the gap to make a spark jump the gap. The method depends upon the fact that, when a spark gap breaks down, the surge of current that flows across the gap is highly transient in character, i. e., it has the form of a very sharp pulse.

The essential components of equipment involved in the basic invention are shown in Fig. 1. These components are: a source of control signal, a spark coil, a spark gap, and a means of coupling from the spark gap to the circuit in which the pulse is to be used. This basic setup is essentially the basis of the conventional automobile ignition system. The important point, in the present connection, is that the purpose and application of the setup concerns the generation of a brief electrical pulse rather than, as in the case of the ignition system, a sudden thermal variation.

Insofar as the basic setup is concerned, the component used as a source of control signal need only supply (with the aid of the spark coil) sufficient voltage to activate the spark gap. If the source itself is adequate for this purpose, the spark coil may be omitted. Oscillators, multivibrators, pulse generators, and noise generators have been used as sources of control signal in successful applications of the basic setup. With regard to the means used in coupling between the spark gap and the output, several alternative arrangements are envisioned. Capacitative coupling has been used successfully in preliminary applications. In later applications, a resistive coupling has been found to be superior.

An elaboration of the basic setup, which is a particular variation of the invention, is shown in Fig. 2. Block diagrams representing an arrangement for generating irregularly spaced audio pulses are shown at the left-hand side of the figure as the source of control voltage. The system of resistive coupling between spark gap and output, mentioned above, is shown at the right-hand side of the drawing. The need for a means of simulating thunderstorm static, and a functional description of the circuit shown in Fig. 2 follow.

The diversity and inconsistency which make natural atmospheric static difficult to measure and specify make accurate measurement and rigorous specification imperative in tests which involve simulated static interference. In addition, it is desirable in laboratory tests to be able to control the characteristics of the test signals; natural static is not under the experimenter's control. For these reasons, a method of simulating static has been worked out. Inasmuch as local thunderstorm static is probably the most intense type of natural static, and inasmuch as it is inherently simpler than other forms (not having traversed long distances under complex conditions of propagation), is was chosen for simulation.

The steps in the process of simulating thunderstorm static are shown in Fig. 3. The first step involves a fluctuating audio-frequency wave A provided by the random noise generator. The noise generator may use a gas tube with high inherent ionization noise. Figure 4 illustrates circuit details of this arrangement. This wave is fed into the "peak-pass" amplifier, which gives it the form shown at B, and then is applied through the power amplifier to the primary of the spark coil. The peak-pass amplifier is shown in Fig. 4. The power amplifier may be of conventional design and requires no further description. The secondary of the spark coil is connected through the small series resistance R to a spark gap (Fig. 2). When the voltage developed across the gap by the secondary reaches the breakdown value, there is a very brief surge of current through the gap and through the resistance. The voltage thus developed across the resistance is a series of very short pulses, one of which is shown at C. These occur at irregular inervals and vary irregularly in amplitude. The irregularity in time and in amplitude is thus derived from the random noise wave containing only audio-frequency components, whereas the sharpness of the output pulses (which accounts for the fact that the spectrum extends high into the radio-frequency range) is due primarily to the suddenness with which the resistance of the spark gap breaks down when the critical voltage is exceeded.

The application of the arrangement to tests of radio equipment is illustrated at D in Fig. 3. This wave represents the audio output of a radio receiver into the input terminals of which the simulated static is fed.

In tests of radio equipment, it is convenient to be able to control the intensity and the density (average pulse repetition frequency) of the static. Control of intensity is provided by a variable RF attenuator connected between the output of the static simulating apparatus and the input of the radio receiver under test. This attenuator is of conventional design and needs no description here. The density of the simulated static may be controlled by adjusting the gain of the peak-pass amplifier (adjust $R_{13}$ in Fig. 4). When the gain is increased, more of the peaks of the voltage wave from a gas-tube generator are passed, and more output pulses are produced. The average PRF may be indicated by a pulse-counting circuit connected to the output of a wide-band monitor receiver.

The simulated thunderstorm static, generated in the way described above, is characterized by almost complete irregularity insofar as the spacing of the individual static pulses is concerned. Some natural static (especially the type referred to as grinders), however, is not completely irregular in this sense. Instead, it is characterized by "burstiness," i. e., the pulses are grouped in bursts or trains. Within these bursts, the pulse spacing is essentially irregular, and the spacing between the bursts themselves is irregular. But the tendency for the pulses to cluster into trains or bursts is greater for grinders than it is for the simulated thunderstorm static.

In order to provide the effect of burstiness in the simulated static, an arrangement was made (see Fig. 4) for modulating the control signal. The modulating signal was generated with the aid of the random modulator circuit shown in Fig. 5. This circuit incorporates a peak-pass amplifier and a triggered multivibrator. When noise from a random noise generator (of the type shown in the upper left-hand part of Fig. 4) is fed into the input of the random modulator, a slowly and irregularly fluctuating signal is generated at the output. This signal, introduced into the circuit of Fig. 4 at the point labelled modulating signal, serves to break up the simulated static into bursts and trains and thus to provide a realistic simulation of grinders.

For certain types of radio tests, it is desirable to simulate the noise from ignition systems. A realistic simulation of this type of noise, also, may be provided by the circuit shown in Fig. 4. The switch designated as SW1 is thrown downward and the output of an audio oscillator, pulse generator, or square-wave generator is fed into the jack labelled alternative input. This amounts, of course, simply to substituting a periodic control signal for the random noise. The output pulses are regularly spaced, therefore, as they are in the noise from ignition systems.

It is believed that the basic setup shown in Fig. 1 and/or certain of the circuits shown in the succeeding figures may be of value in connection with applications other than the simulation of electrical interference. One such application concerns the testing or investigation of physical materials, wherein it is desired to subject the material under test to very brief surges of electrical power, voltage, or current. An example of this type of application is the study of electron emission from the cathode of a vacuum tube when another electrode of the vacuum tube is subjected to a voltage pulse of brief duration. In other applications, the pulses might be used as stimuli (shocks), as time markers, or as modulating signals for systems of communication (or navigation or detection) which involve the generation of very short trains of high-frequency waves. Various other applications may be practiced in accordance with the spirit of the invention as defined by the scope of the appended claims.

I claim:

1. Means for producing sharp pulses of radio frequency electrical power comprising a source of random control signals having an output circuit, said output circuit comprising a spark gap and resistor in series connection; and means across said resistor for utilizing pulses produced across said resistor.

2. Means for producing sharp pulses of high frequency electrical power comprising a source of random control signals having an output circuit, said output circuit having means for producing highly transient currents, said means including a spark gap and resistor in series connection; and means across said resistor for utilizing pulses produced across said resistor.

JOSEPH C. R. LICKLIDER.

REFERENCES CITED

The following references are of record in the file of this patent:

UNITED STATES PATENTS

| Number | Name | Date |
|---|---|---|
| Re. 12,151 | Stone | Sept. 8, 1903 |
| 1,489,031 | Hammond | Apr. 1, 1924 |
| 1,571,371 | Clark | Feb. 2, 1926 |
| 2,106,429 | Hofmann | Jan. 25, 1938 |
| 2,207,620 | Hilferty | July 9, 1940 |
| 2,253,975 | Guanella | Aug. 26, 1941 |
| 2,284,101 | Robins | May 26, 1942 |
| 2,400,456 | Haine et al. | May 14, 1946 |
| 2,400,457 | Haine | May 14, 1946 |
| 2,416,307 | Grieg | Feb. 25, 1947 |